C. A. & O. W. HULT.
MOTOR DRIVEN CREAM SEPARATOR.
APPLICATION FILED FEB. 18, 1916.
1,216,572.  Patented Feb. 20, 1917.
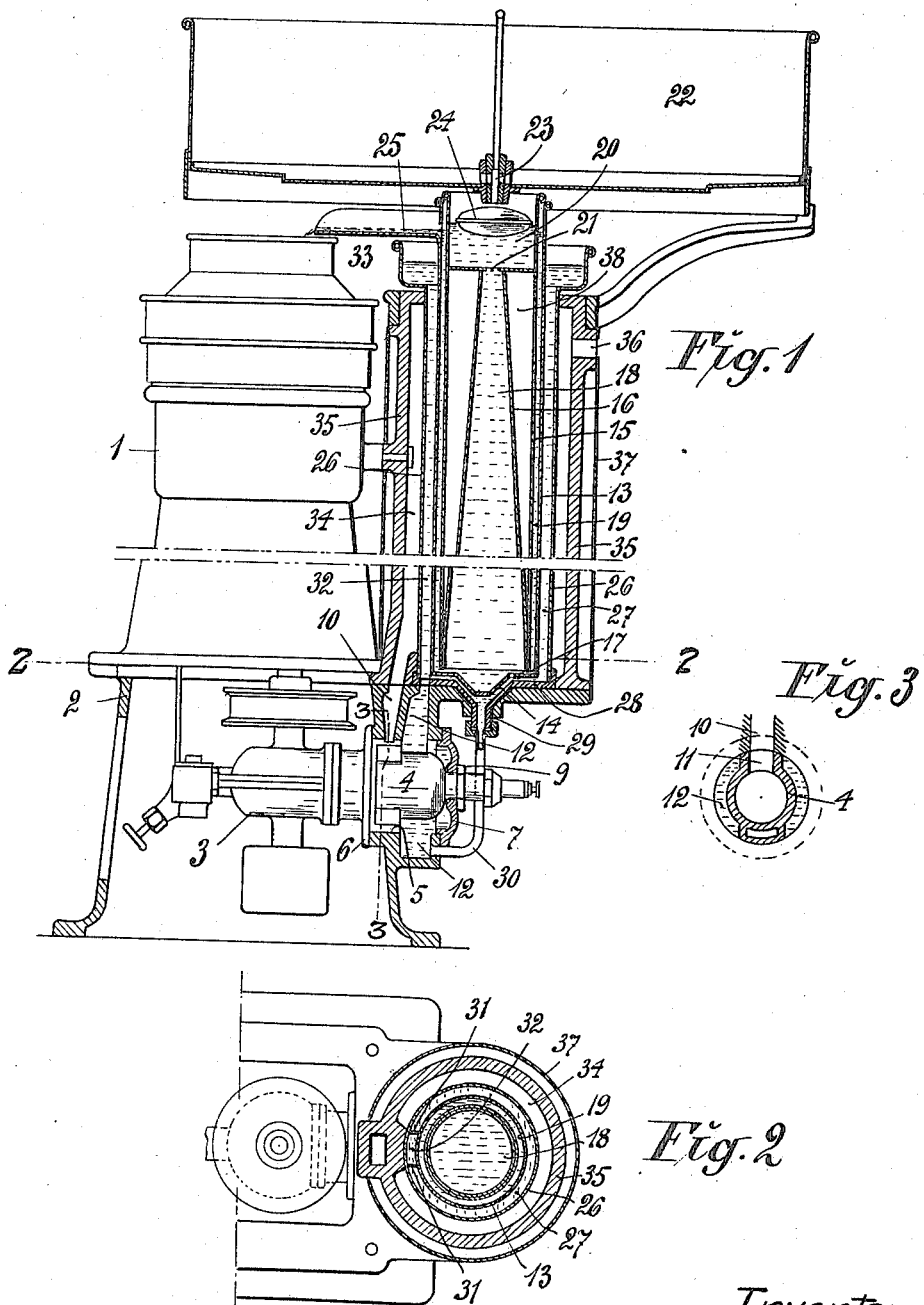
Inventors
Carl Alrik Hult and
Oscar Walfrid Hult
Attorney.

UNITED STATES PATENT OFFICE.

CARL ALRIK HULT AND OSCAR WALFRID HULT, OF STOCKHOLM, SWEDEN.

MOTOR-DRIVEN CREAM-SEPARATOR.

1,216,572.      Specification of Letters Patent.      Patented Feb. 20, 1917.

Application filed February 18, 1916. Serial No. 79,047.

*To all whom it may concern:*

Be it known that we, CARL ALRIK HULT and OSCAR WALFRID HULT, subjects of the King of Sweden, and residents of Inedalsgatan 1, Stockholm, in the Kingdom of Sweden, have invented certain new and useful Improvements in Motor-Driven Cream-Separators, of which the following is a specification, reference being had therein to the accompanying drawing.

For the running of centrifugal cream separators which require more power than can be easily effected manually steam has generally been used as motive force. The steam, which passes through a steam turbine (generally directly coupled to the separator spindle) or through a common steam-engine, has, as exhaust steam, been used for heating the milk to be separated to a temperature suitable for the separating procedure. The heating of the milk to a temperature at which the separating process is most easily effected, is of the greatest importance, for the reason that, if the milk is not heated to a temperature of at least 37° centigrade, the separating of the cream from the milk will be bad, owing to the fact that the skimmed milk will contain a greater quantity of fat the more the temperature is lowered under the said degree.

Although steam as motive power in driving cream separators, has its great advantage when the exhaust steam is also used as a heating medium for raising the temperature of the milk, it is not very practical when only a small amount of power is wanted.

A steam boiler and its fittings occupy a great space, require a lot of work before the steam is raised to the necessary pressure, must be kept under constant attention, while doing their work, and are not entirely safe, if not managed properly.

For these reasons small gasolene- benzine- or petrol-engines have lately come into very great use as motive power for driving cream separators. The said engines can be started at the moment the separating procedure is to commence, they occupy a relatively small room, work automatically and can be managed by almost anybody without danger.

In the said engines, however, the cylinders must be cooled, which is generally effected in two ways viz. by water jackets inclosing the cylinders, or by fans forcing air toward the outside of the cylinders. The latter way of cooling the cylinders which is done mechanically and automatically has the advantage of the engines occupying small spaces and always being ready for use, and the disadvantage of the fans requiring a good deal of power which is wasted for cooling purposes.

The former way of cooling the engines requires an outfit consisting, in its simplest form, of a water tank and pipes connected with the water jacket of the engine. The said water tank or tanks, which must be very large with relation to the power of the engine and the time it has to run continually, occupy a great space and work generally badly, if the cooling water is not often renewed or cooled by air. In both systems the heat radiating from the working cylinders is entirely lost and absorbed by the water and air used for the cooling purposes.

This invention relates to a device by which the related disadvantages in the use of combustion engines as motive power for running cream separators are eliminated, but the advantages of both systems, the steam- and combustion engines, are at hand.

According to this invention a combined milk heating and liquid cooling apparatus is combined with a combustion engine in such manner, that the cooling medium or water of the cooling jacket of the engine, is caused to circulate through the apparatus whereby the heat is delivered to the milk on its way to the cream separator and the water is cooled down, on its way to the cooling jacket. The hot exhaust gases of the engine may also pass through the said apparatus and heat the milk. By means of this apparatus the heating of the milk is effected in a very simple manner without any extra costs of fuel, and the cooling of the engine is also done automatically and effectively, at a constant temperature, during the whole time the engine is driving the cream separator and the separation takes place.

The space required for the engine and separator is relatively small and the whole plant is cheap, efficient and self-contained.

The heat from the liquid fuel, used in running the engine, of which only a small per cent. can be transmitted into effective work in the engine, is by means of this device to a great extent saved and used for heating the milk. The milk in its turn automatically effects the cooling of the engine in the most efficient way, without any loss of power and without the use of cumbersome, and ineffective apparatuses.

The said engine, which may be of a simple and cheap construction, is preferably mounted in the frame of the separator and in such manner, that the wall of the working cylinder and the said frame together form the cooling jacket of the engine.

A form of the invention is shown in the accompanying drawing. Figure 1 shows in a side view a milk separator driven by an internal combustion engine combined with a combined milk heating and liquid cooling apparatus, shown in a vertical section. Fig. 2 is a horizontal section on the line 2—2 of Fig. 1. Fig. 3 is a section on the line 3—3 of Fig. 1.

1 is the separator, and 2 is the frame or foot stand of the same. 3 is the internal combustion engine, actuating the separator drum by means of any suitable motion transmitting device. 4 is the working cylinder of the said engine. The said cylinder 4 is mounted in an opening 5 in the frame of the separator and provided with a flange 6 tightening against the frame. A disk or cover 7 is located at the end of the cylinder and is tightened against the frame 2 by means of a nut 9, the engine 3 being thus held in position. In the frame 2 a channel 10 is provided communicating with the opening 11 for the exhaust gases of the engine. 12 is a chamber provided in the frame 2. The said chamber incloses the cylinder 4, and the wall of the chamber 12 and the wall of the cylinder 4 form together the cooling jacket of the engine. Consequently, no cooling jacket is provided in the wall of the cylinder, as hitherto generally has been the case, for which reason the engine may be manufactured in a very cheap manner.

The combined milk heating and liquid cooling apparatus, mentioned above, comprises a cylindrical wall 13 with a downward tapering bottom wall 14. Inside the wall 13 a cylindrical partition wall 15 is provided, concentric with the wall 13 and connected at its bottom end with a conical wall 16, located inside the wall 15. Between the bottom edges of the said walls 15, 16 and the bottom 14 there is a space 17 through which the chamber 18 formed by the wall 16 communicates with the chamber 19 inclosed by the walls 13 and 15. The chamber 18 communicates at its top end with a cup 20 through an opening 21. The milk to be heated passes from a vessel 22 to the cup 20 through a cock of any ordinary construction. The flow of the milk through the channel 23 is controlled by a float 24. From the cup 20 the milk passes downward through the chamber 18 and then upward through the chamber 19, at the top end of which the milk passes through a channel 25 to the separator 1. Outside the wall 13 a cylindrical wall 26 is provided which is concentric with the wall 13 and together with the same forms a chamber 27. The said wall 26 is at its lower end fixed to a bottom piece 28 of substantially the same shape as the bottom 14 and extending downward at its center forming a pipe 29. To the said pipe 29 a pipe 30 is fixed, which communicates with the lower part of the cooling jacket 12. In the chamber 27 two vertical partition walls 31 are provided. The channel 32, located between the said walls 31, communicates with the top part of the cooling jacket 12 and extends to or to the vicinity of a cup 33, provided at the top end of the chamber 27 and communicating with the same. The chamber 27, the channel 32 and substantially the whole cup 33 contain cooling liquid, as shown.

While the engine 3 operates, the liquid contained in the jacket 12 is heated by the hot cylinder 4 and consequently is forced upward through the channel 32 by the cooler liquid contained in the chamber 27, which passes downward through the pipe 30 to the jacket 12. As the liquid passes upward through the channel 32 and downward through the chamber 27, it heats the milk passing through the chamber 19 and consequently the liquid itself is cooled. In this manner the liquid will continually circulate through jacket 12, channel 32, chamber 27 and pipe 30 and cool the cylinder 4, at the same time as the milk is heated. The exhaust gases of the engine pass from the channel 10 through a chamber 34, provided between the wall 26 and a wall 35, forming, so to say, the frame of the milk heating apparatus. The exhaust gases leaves the said chamber 34 through an opening 36 at the top end of the same. The heat of the said exhaust gases is delivered to the liquid contained in the chamber 27 and the channel 32 and is then absorbed by the milk. The chamber 34 serves at the same time as a muffler for the exhaust gases. The heated wall 35 is insulated, by means of air contained between the walls 35 and 37, in order to save as much as possible of the heat of the engine, which otherwise would radiate in the open air and also in order to lower the temperature of the outside wall of the apparatus. The milk contained in the chamber 18 is also insulated from the milk in the chamber 19 by air contained in the concentric room 38, in order that the heated milk in the chamber 19 should not be cooled by the colder milk in the chamber 18. The quantity of the milk passing through the chamber 19 is so adapted, that the milk sufficiently cools the liquid. The chamber 34 may be omitted, provided that the heating apparatus is so adapted, that the cooling liquid heated by the cylinder will sufficiently heat the milk. In order to increase the heat transmitting surfaces the walls 13 and 26 may be corrugated longitudinally or otherwise, as easily understood by those skilled in the art.

Having now described our invention, what we claim as new and desire to secure by Letters Patent is:

1. The combination of a centrifugal liquid separator, an internal combustion engine, actuating the drum of the separator, and a combined milk heating and liquid cooling apparatus comprising separate chambers for the milk and for the liquid to be cooled the latter communicating with the cooling jacket of the said engine, substantially as described and for the purpose set forth.

2. The combination of a centrifugal liquid separator, an internal combustion engine, means connecting the shaft of the engine with the drum of the separator, and a combined milk heating and liquid cooling apparatus, comprising substantially concentric chambers for the milk, for the liquid to be cooled, communicating with the cooling jacket of the engine, and for the exhaust gases of the engine, substantially as described and for the purpose set forth.

3. The combination of a centrifugal liquid separator, an internal combustion engine, means connecting the shaft of the engine with the drum of the separator, a combined milk heating and liquid cooling apparatus, comprising substantially concentric chambers for the milk, for the liquid to be cooled, communicating with the cooling jacket of the engine, and for the exhaust gases of the engine, a channel provided in the chamber for the liquid to be cooled, extending from the top part of the cooling jacket to the top of the chamber, and a passage connecting the bottom part of the said chamber with the bottom part of the cooling jacket, substantially as described and for the purpose set forth.

4. The combination of a centrifugal liquid separator, an internal combustion engine, means connecting the shaft of the engine with the drum of the separator, and a combined milk heating and liquid cooling apparatus, comprising substantially concentric chambers for the milk, for the liquid to be cooled, communicating with the cooling jacket of the engine, and for the exhaust gases of the engine, an insulating chamber located between a central part of the milk chamber and an outer part of the same, and an insulating chamber, located outside the apparatus, substantially as described and for the purpose set forth.

5. The combination of a centrifugal liquid separator, an internal combustion engine, means connecting the shaft of the engine with the drum of the said separator, a chamber, which is provided in the frame of the separator, and into which the cylinder of the engine extends, tightening against the said frame and forming together with the wall of the chamber the cooling jacket of the engine, and a combined milk heating and liquid cooling apparatus comprising separate chambers for the milk and for the liquid to be cooled, the latter communicating with the said cooling jacket, substantially as described and for the purpose set forth.

In witness whereof, we have hereunto signed our names.

CARL ALRIK HULT.
OSCAR WALFRID HULT.

Copies of this patent may be obtained for five cents each, by addressing the "Commissioner of Patents, Washington, D. C."